US012670476B2

(12) United States Patent
Matsunaga et al.

(10) Patent No.: US 12,670,476 B2
(45) Date of Patent: Jun. 30, 2026

(54) NOTIFICATION SYSTEM, NOTIFICATION DEVICE, NOTIFICATION METHOD, AND RECORDING MEDIUM

(71) Applicant: Panasonic Intellectual Property Management Co., Ltd., Osaka (JP)

(72) Inventors: Satoru Matsunaga, Osaka (JP); Hiroki Urabe, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 272 days.

(21) Appl. No.: 18/713,084

(22) PCT Filed: Oct. 10, 2023

(86) PCT No.: PCT/JP2023/036766
§ 371 (c)(1),
(2) Date: May 23, 2024

(87) PCT Pub. No.: WO2024/116607
PCT Pub. Date: Jun. 6, 2024

(65) Prior Publication Data
US 2026/0179049 A1 Jun. 25, 2026

(30) Foreign Application Priority Data

Nov. 28, 2022 (JP) ................................. 2022-189470

(51) Int. Cl.
*H04L 51/224* (2022.01)
*G06Q 10/107* (2023.01)
*H04L 51/214* (2022.01)

(52) U.S. Cl.
CPC ......... *G06Q 10/107* (2013.01); *H04L 51/214* (2022.05); *H04L 51/224* (2022.05)

(58) Field of Classification Search
CPC .... G06Q 10/107; H04L 51/214; H04L 51/224
See application file for complete search history.

(56) References Cited

U.S. PATENT DOCUMENTS 8,504,626 B2 * 8/2013 Nairn ................... H04L 51/224
713/170
10,431,188 B1 * 10/2019 Nelson ................... G09G 5/363
(Continued)

FOREIGN PATENT DOCUMENTS

JP 2008-048389 A 2/2008
JP 2016081424 A * 5/2016

OTHER PUBLICATIONS

International Search Report dated Dec. 5, 2023 issued in International Patent Application No. PCT/JP2023/036766.
(Continued)

*Primary Examiner* — Nabil H Syed
(74) *Attorney, Agent, or Firm* — Rimon P.C.

(57) ABSTRACT

A notification system includes a first obtainer, a second obtainer, an identifier, a determiner, and an outputter. The first obtainer obtains notification information including a sender of a notification and a receiver of the notification. The second obtainer obtains hearer information including a hearer of the notification. The identifier identifies a relationship between the sender, the receiver, and the hearer, based on the notification information and the hearer information obtained. The determiner determines designated names used to call the sender and the receiver, based on the relationship identified by the identifier. The outputter outputs, to a notification device, a first instruction causing notification device to output a first message indicating that the notification has been made. In the first message, the sender and the receiver are represented by the designated names determined by the determiner.

8 Claims, 4 Drawing Sheets

(56) References Cited

U.S. PATENT DOCUMENTS

| 2008/0045249 | A1  | 2/2008 | Nam |
| 2013/0144619 | A1  | 6/2013 | Lord et al. |
| 2014/0136609 | A1* | 5/2014 | Churchill ............. H04L 51/212 |
| | | | 709/206 |

OTHER PUBLICATIONS

Extended European Search Report dated Jan. 29, 2026 issued in the corresponding European Patent Application No. 23897266.5.

* cited by examiner

FIG. 2

| User | Attribute | Name |
|------|-----------|------|
| A | Father | AA |
| B | Mother | BB |
| C | Child (female) | CC |
| D | Child (male) | DD |
| ⋮ | ⋮ | ⋮ |

FIG. 3

| Relationship | Designated name |
|--------------|-----------------|
| Mother to father | AA |
| Child to mother | Mom |
| Child to father | Dad |
| Mother to child (female) | CC |
| Mother to child (male) | DD |
| ⋮ | ⋮ |

NOTIFICATION SYSTEM, NOTIFICATION DEVICE, NOTIFICATION METHOD, AND RECORDING MEDIUM

CROSS-REFERENCE OF RELATED APPLICATIONS

This application is the U.S. National Phase under 35 U.S.C. § 371 of International Patent Application No. PCT/JP2023/036766, filed on Oct. 10, 2023, which in turn claims the benefit of Japanese Patent Application No. 2022-189470, filed on Nov. 28, 2022, the entire disclosure of which Applications are incorporated by reference herein.

TECHNICAL FIELD

The present disclosure relates to a notification system, and so on, that cause a notification device to output a message indicating a notification.

BACKGROUND ART

For example, Patent Literature (PTL) 1 discloses a method of transmitting a short message, using a mobile terminal. This transmission method includes a first stage, a second stage, a third stage, and a fourth stage. In the first stage, original and corrected character strings are set for possible receivers in an address list. In the second stage, a short message, which includes an original character string to be transmitted to receivers, is input. In the third stage, the original character string in the short message is replaced with a corrected character string to generate short messages corrected for the receivers. In the fourth stage, the corrected short messages are transmitted.

CITATION LIST

Patent Literature

[PTL 1] Japanese Unexamined Patent Application Publication No. 2008-48389

SUMMARY OF INVENTION

Technical Problem

The present disclosure provides a notification system, and so on, that allow the hearer to easily grasp the sender and the receiver of a notification.

Solution to Problem

A notification system according to an aspect of the present disclosure includes: a first obtainer that obtains notification information including a sender of a notification and a receiver of the notification; a second obtainer that obtains hearer information including a hearer of the notification; an identifier that identifies a relationship between the sender, the receiver, and the hearer, based on the notification information obtained by the first obtainer and the hearer information obtained by the second obtainer; a determiner that determines designated names used to call the sender and the receiver, based on the relationship identified by the identifier; and an outputter that outputs, to a notification device, a first instruction causing the notification device to output a first message indicating that there is the notification. In the first message, the sender and the receiver are represented by the designated names determined by the determiner.

A notification device according to an aspect of the present disclosure includes: an instruction obtainer that obtains the first instruction from the notification system; and a notification outputter that outputs the first message, when the instruction obtainer obtains the first instruction.

A notification method according to an aspect of the present disclosure includes: obtaining notification information including a sender of a notification and a receiver of the notification; obtaining hearer information including a hearer of the notification; identifying a relationship between the sender, the receiver, and the hearer, based on the notification information and the hearer information obtained; determining designated names used to call the sender and the receiver, based on the relationship identified; and outputting, to a notification device, a first instruction causing the notification device to output a first message indicating that the notification has been made. In the first message, the sender and the receiver are represented by the designated names determined.

A recording medium according to an aspect of the present disclosure is a non-transitory computer-readable recording medium having recorded thereon a program for causing one or more processors to execute the notification method described above.

Advantageous Effects of Invention

The notification system, and so on, according to the present disclosure are advantageous in causing the hearer to easily grasp the sender and the receiver of a notification.

BRIEF DESCRIPTION OF DRAWINGS

FIG. 2 shows example relationship information.

FIG. 3 shows example designated name information.

DESCRIPTION OF EMBODIMENT

Figure 1:
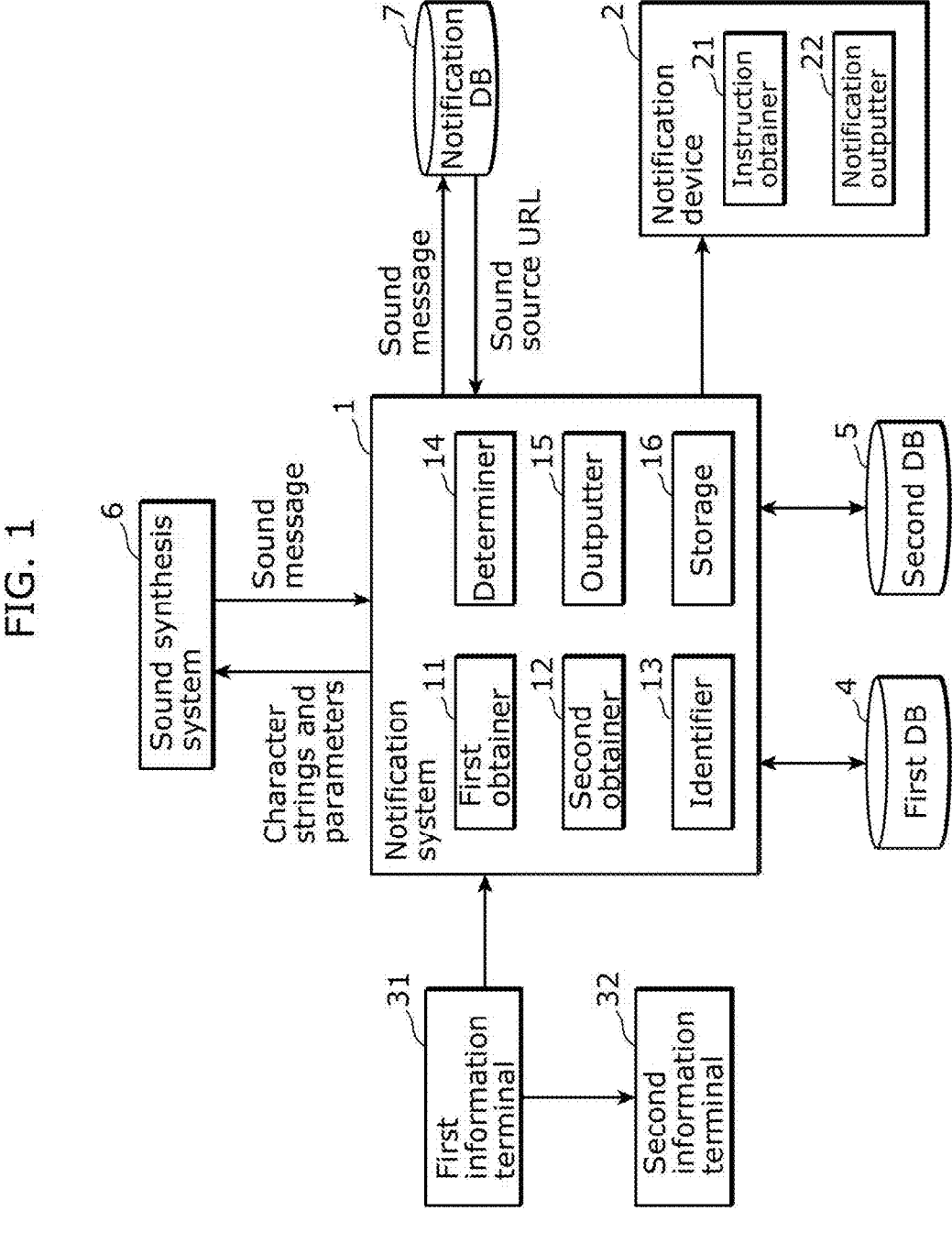
FIG. 1 is a block diagram showing an overall configuration including a notification system according to an embodiment.

Underlying Knowledge Forming Basis of the Present Disclosure

First, the inventor's point of view will be described below.

As disclosed in PTL 1, there is a typical technique of transmitting a short message (message) using a mobile terminal after correcting the message in accordance with the attribute of the receiver of the message. This technique corrects the designated name used to call the receiver, for example, in accordance with the age, occupation, group, relatives, or other attributes of the receiver.

The technique described above assumes that only the receiver of the message hears the message. However, for example, a third person different from the sender and receiver of the message may hear the message. As an example, in addition to the mobile terminal of the receiver, a notification device, such as a home appliance, with a sound output function may emit the message. In such a case, if the designated names used to call the sender and the receiver in the message are different from those usually used by the third person, the third person cannot grasp the sender and receiver of the message.

In view of the forgoing, the inventor has conceived of the present disclosure.

Now, an embodiment will be described in detail with reference to the drawing as appropriate. Unnecessarily detailed description may be however omitted. For example, detailed description of already well-known matters and duplicated description of substantially the same configurations may be omitted. This is for avoiding unnecessarily redundant description and for easier understanding of the present disclosure by those skilled in the art.

Note that the inventor provides the appended drawings and the following description for sufficient understanding of the present disclosure by those skilled in the art and does not intend to limit the subject matters of the claims by the appended drawings and the following description.

Embodiment

[1-1. Overall Configuration]

First, an overall configuration including notification system 1 according to the embodiment will be described with reference to FIG. 1. FIG. 1 is a block diagram showing the overall configuration including notification system 1 according to the embodiment. Notification system 1 is for causing notification device 2 to output a first message indicating that a notification has been made, when a sender makes the notification to a receiver. In the embodiment, notification system 1 causes notification device 2 to output not only the first message but also a second message indicating the content of the notification.

The first message includes the information indicating the sender and receiver of the notification. For example, assume that the name of the sender of the notification is "AA", while the name of the receiver of the notification is "BB". In this case, the first message may be "There is a message from AA to BB". The second message includes a message from the sender to the receiver. For example, the second message may be "Take in the laundry".

Specifically, the sender operates first information terminal 31 owned by the sender and creates a message to the receiver, using an application provided by a social networking service (SNS), such as LINE (registered trademark). Note that the sender may operate first information terminal 31 and create a message to the receiver using a short message service (SMS) provided by a mobile carrier. The message created by the sender may be a text message or a sound message.

Next, the sender transmits the created message, while designating the receiver as the address. Accordingly, first information terminal 31 transmits the message created by the sender, for example, via a network, such as the Internet or mobile communication network (hereinafter simply referred to as a "network"), to second information terminal 32 owned by the receiver. Notification system 1 obtains the message via the network and causes notification device 2 to output the first message and the second message, based on the obtained message.

First information terminal 31 and second information terminal 32 are each a mobile terminal, such as a smartphone. Note that first information terminal 31 and second information terminal 32 may be each a tablet terminal or an information device, such as a personal computer. First information terminal 31 may be a home appliance, for example.

Notification device 2 can make a notification from a sender to a receiver, and to hearer L1 (see FIG. 5 or 6) as well. Here, hearer L1 is basically assumed to be a third person different from the sender or the receiver but may be the receiver. In the embodiment, the notification by notification device 2 is made, for example, by outputting a sound from a speaker. Note that the notification by notification device 2 may be made, for example, by displaying a character string, an image, etc., on an attached display, or may be made by both the sound output and the display.

Notification device 2 is placed, for example, in a facility, such as the residence of the sender, the receiver, or hearer L1 and have the sound output function or the display function described above. In the embodiment, notification device 2 is a home appliance. Specifically, notification device 2 may include, for example, a smart speaker, a television receiver, lighting equipment, a pet camera, an intercom master unit, an intercom slave unit, an air conditioner, and a robot vacuum cleaner. Note that notification device 2 may be a portable information device, such as a portable television receiver, a smartphone, a tablet terminal, or a laptop personal computer, owned by the user. The facility in which notification device 2 is placed is not limited to a detached house or an apartment, but may be a residential facility, such as a share house, or may be a facility, such as a store, an office, a hospital, a library, or a school, other than a residential facility.

Notification device 2 includes instruction obtainer 21 and notification outputter 22. In the embodiment, notification device 2 includes a processor and a memory. The processor executes the computer programs stored in the memory to achieve the components of notification device 2.

Instruction obtainer 21 obtains a first instruction from notification system 1. The first instruction causes notification device 2 to output a first message indicating that a notification has been made. Instruction obtainer 21 obtains a second instruction from notification system 1. The second instruction causes notification device 2 to output a second message indicating the content of the notification. In the embodiment, instruction obtainer 21 receives an instruction signal transmitted from notification system 1 via the network, thereby obtaining the first instruction and the second instruction included in the instruction signal.

When instruction obtainer 21 obtains the first instruction and the second instruction, notification outputter 22 outputs the first message and the second message. For example, if notification device 2 has a sound output function, notification outputter 22 outputs the first message and the second message as follows. As will be described later, notification outputter 22 accesses the sound source uniform resource locator (URL) contained in the instruction signal, downloads the sound message, and reproduces the sound message. Note that notification outputter 22 may output the first message and the second message by reproducing the respective sound messages contained in the first instruction and the second instruction. If the memory of notification device 2 stores various sound messages in advance, notification outputter 22 may read the associated sound messages from the memory in accordance with the first instruction and the second instruction and reproduce the sound messages. If notification device 2 has a function of automatically generating a sound message, notification outputter 22 may generate and reproduce the associated sound messages in accordance with the first instruction and the second instruction.

For example, if notification device 2 has a display function, notification outputter 22 may output the first message and the second message by causing a display to display character strings, images, etc., included in the first instruction and the second instruction, while reproducing the sound messages. If the memory of notification device 2 stores various character strings, images, etc., in advance, notification outputter 22 may read the associated character strings, images, etc., from the memory in accordance with the first instruction and the second instruction, and causes the display to display the character strings, images, or etc. If notification device 2 has a function of automatically generating character strings, images, or etc., notification outputter 22 may generate the associated character strings, images, etc., in accordance with the first instruction and the second instruction, and cause the display to display the character strings, images, etc.

[1-2. Notification System]

Next, details of notification system 1 will be described. As shown in FIG. 1, notification system 1 includes first obtainer 11, second obtainer 12, identifier 13, determiner 14, outputter 15, and storage 16. While notification system 1 includes storage 16 in the embodiment, storage 16 is not necessarily a component of notification system 1.

In the embodiment, notification system 1 is a server. The server includes a processor and a memory. The processor executes the computer programs stored in the memory to achieve the components of notification system 1. In the embodiment, the memory corresponds to storage 16.

Notification system 1 is communicative with notification device 2, first information terminal 31, and second information terminal 32 via the network. In the example shown in FIG. 1, there are one notification device 2, one first information terminal 31, and one second information terminal 32. There may be a plurality of notification devices 2, first information terminals 31, and second information terminals 32. In addition, notification system 1 is communicative with first database ("First DB" in FIG. 1) 4, second database ("second DB" in FIG. 1) 5, sound synthesis system 6, and notification database ("notification DB" in FIG. 1) 7 via the network. In the example shown in FIG. 1, first database 4, second database 5, sound synthesis system 6, and notification database 7 are servers different from notification system 1 but may be the same server as notification system 1.

First obtainer 11 obtains notification information including the sender and the receiver of a notification. In the embodiment, as already mentioned, first information terminal 31 transmits the message created by the sender via the network to second information terminal 32 owned by the receiver. A signal transmitted from this first information terminal 31 is also transmitted to notification system 1 via the network. The signal transmitted from this first information terminal 31 includes the message, the information indicating the sender as the source, and the information indicating the receiver as the destination. Accordingly, by receiving the signal transmitted from first information terminal 31 via the network, first obtainer 11 obtains the notification information included in the signal.

Second obtainer 12 obtains hearer information including hearer L1 of the notification. In the embodiment, when first obtainer 11 obtains notification information, second obtainer 12 obtains the hearer information in accordance with one of the following first or second example.

As the first example, second obtainer 12 obtains the hearer information that identifies hearer L1, based on the location of notification device 2. Specifically, notification system 1 causes, for example, storage 16 or any other suitable element to store, in advance, information indicating each notification device 2 and a user who is likely to hear a notification from this notification device 2 in association. By referring to the information, second obtainer 12 then obtains the hearer information, regarding the user who is likely to hear the notification from this notification device 2 as hearer L1, based on the location (i.e., the installation point) of notification device 2.

For example, if notification device 2 is located in a child's room, a child is the user who is likely to hear the notification from this notification device 2. Second obtainer 12 thus identifies the child as hearer L1 and obtains the hearer information. For example, if notification device 2 is located in a study, the father is the user who is likely to hear the notification from this notification device 2. Second obtainer 12 thus identifies the father as hearer L1 and obtains the hearer information. For example, if notification device 2 is located in a kitchen, the mother is the user who is likely to hear the notification from this notification device 2. Second obtainer 12 thus identifies the mother as hearer L1 and obtains the hearer information.

As the second example, second obtainer 12 obtains the hearer information that identifies hearer L1, based on a result of recognizing a person near notification device 2. Specifically, second obtainer 12 communicates with notification device 2 via the network to inquire of notification device 2 about the result of recognizing a person near notification device 2. In the second example, notification device 2 includes a recognition sensor that recognizes the person near notification device 2, and recognizes a person near notification device 2 using the recognition sensor. Notification device 2 then communicates with notification system 1 via the network to transmit a signal indicating the result of recognition by the recognition sensor to notification system 1. Accordingly, notification system 1 identifies hearer L1 as a person near notification device 2 and obtains the hearer information.

The recognition sensor is a device capable of communicating with an information terminal, such as a smartphone, under a near field wireless communication protocol, such as the Bluetooth (registered trademark). In this case, the recognition sensor communicates with a smartphone owned by the person near notification device 2 to obtain the identifier (Id) of the smartphone, thereby recognizing the person near notification device 2. Alternatively, the recognition sensor is a reader that reads a radio frequency identification (RFID) tag under a near field wireless communication protocol, for example. In this case, the recognition sensor communicates with the RFID tag owned by the person near notification device 2 to obtain the ID of the RFID tag, thereby recognizing the person near notification device 2.

The recognition sensor may be an image recognition device including an imaging device, for example. In this case, the recognition sensor captures the surrounding of notification device 2 using the imaging device and executes appropriate image analysis processing on the captured image to recognize a person in the image. Alternatively, the recognition sensor may be a sound recognition device including a microphone, for example. In this case, the recognition sensor collects the sounds around notification device 2 using the microphone and executes appropriate sound analysis processing on the collected sounds to recognize a person uttering voice included in the sounds.

Identifier 13 identifies the relationship between the sender, the receiver, and hearer L1, based on the notification information obtained by first obtainer 11 and the hearer information obtained by second obtainer 12. Specifically, identifier 13 compares the sender and the receiver included in the notification information and hearer L1 included in the hearer information to the relationship information stored in first database 4 to identify the relationship between the sender, the receiver, and hearer L1.

FIG. 2 shows example relationship information. In the table shown in FIG. 2, the column "User" indicates the identifier for identifying the user included in the notification information or the hearer information. In the table shown in FIG. 2, each identifier is represented simply by an alphabet. In the table shown in FIG. 2, the column "Attribute" indicates the attribute of each user. In the table shown in FIG. 2, the column "Name" indicates the name of each user. The name of each user is here the first name.

For example, assume that the notification information includes "A" as a sender and "B" as a receiver, and the hearer information includes "C" as hearer L1. In this case, identifier 13 identifies, as the relationship, that the sender is a father, the receiver is a mother, and hearer L1 is child (female) (i.e., daughter).

Determiner 14 determines the designated names used to call the sender and the receiver, based on the relationship identified by identifier 13. Specifically, determiner 14 compares the relationship identified by identifier 13 to the designated name information stored in second database 5 to determine the designated names used to call the sender and the receiver.

FIG. 3 shows example designated name information. In the table shown in FIG. 3, the column "Relationship" shows the relationship between hearer L1 and the sender, or between hearer L1 and the receiver. For example, "Mother to father" means that hearer L1 is the mother, and the sender or the receiver is the father. For example, "Child to mother" means that hearer L1 is a child (regardless of gender), and the sender or the receiver is the mother. In the table shown in FIG. 3, the column "Designated name" indicates the designated name how hearer L1 calls the sender or the designated name how hearer L1 calls the receiver. For example, if hearer L1 is the mother and the sender or the receiver is the father, the father is called "AA" which is the name of the father. For example, if hearer L1 is a child (regardless of gender) and the sender or the receiver is the mother, the mother is called "Mom" which is used when the child calls the mother.

For example, assume that the relationship identified by identifier 13 indicates that the sender is the father, the receiver is the mother, and hearer L1 is a child (male) (i.e., son). In this case, determiner 14 determines "Dad" as the designated name used to call the sender and "Mom" as the designated name used to call the receiver.

Outputter 15 outputs, to notification device 2, a first instruction causing notification device 2 to output a first message indicating that a notification has been made. In addition, outputter 15 further outputs, to notification device 2, a second instruction causing notification device 2 to output a second message indicating the content of the notification.

In the first message, the sender and the receiver are represented by the designated names determined by determiner 14. For example, assume that determiner 14 determines to call the sender "Dad", and the receiver "Mom". In this case, the first message is represented by the character string "There is a message from Dad to Mom". For example, assume that determiner 14 determines "Mom" as the designated name used to call the sender, and "CC" as the name of the receiver. In this case, the first message is represented by the character string "There is a message from Mom to CC.".

In the embodiment, outputter 15 transmits an instruction signal including the first instruction and the second instruction via the network to notification device 2, thereby causing notification device 2 to output the first message and the second message.

In the embodiment, outputter 15 transmits an instruction signal including a sound source URL to notification device 2. By accessing the sound source URL, sound messages corresponding to the first message and the second message can be downloaded. That is, in the embodiment, output of an instruction to notification device 2 corresponds to transmission of a sound source URL. Note that outputter 15 may transmit, for example, the instruction signal including the sound message to notification device 2. Assume that, for example, the memory of notification device 2 stores various sound messages in advance, or notification device 2 has a function of automatically generating a sound message. In either case, outputter 15 may transmit, to notification device 2, the instruction signal including an instruction designating a sound message to be reproduced by notification device 2.

Storage 16 is a storage device that stores information (e.g., computer programs) necessary for the processor of notification system 1 to perform various types of control. Storage 16 is a semiconductor memory, for example, but is not limited thereto and may be any known electronic information storage means. Storage 16 stores instruction data or other information included in the instruction signal transmitted to notification device 2, for example.

First database 4 is a storage device that stores the relationship information described above. First database 4 is a semiconductor memory, for example, but is not limited thereto and may be any known electronic information storage means.

Second database 5 is a storage device that stores the designated name information described above. Second database 5 is a semiconductor memory, for example, but is not limited thereto and may be any known electronic information storage means.

Sound synthesis system 6 obtains, from notification system 1, a character string indicating the first message, a character string indicating the second message, and the parameters related to a sound source to be used. Sound synthesis system 6 then synthesizes the sounds, using the obtained character strings and parameters to generate sound messages. Sound synthesis system 6 transmits the generated sound messages to notification system 1.

Notification database 7 is a storage device that stores various sound messages transmitted from notification system 1 in association with sound source URLs. Notification database 7 is a semiconductor memory, for example, but is not limited thereto and may be any known electronic information storage means.

In the embodiment, notification system 1 basically causes sound synthesis system 6 to generate the sound messages corresponding to the first message and the second message, and notification database 7 to store the generated sound messages and the sound source URL associated with the sound messages. Notification system 1 then transmits the sound source URL via the network to notification device 2 to output, to notification device 2, a first instruction and a second instruction causing notification device 2 to output the first message and the second message. If there is an existing sound message in notification database 7, notification system 1 reads the sound source URL associated with the sound message from notification database 7 and transmits the read sound source URL to notification device 2, without causing sound synthesis system 6 to generate any sound message.

2. Operation

Figure 4:
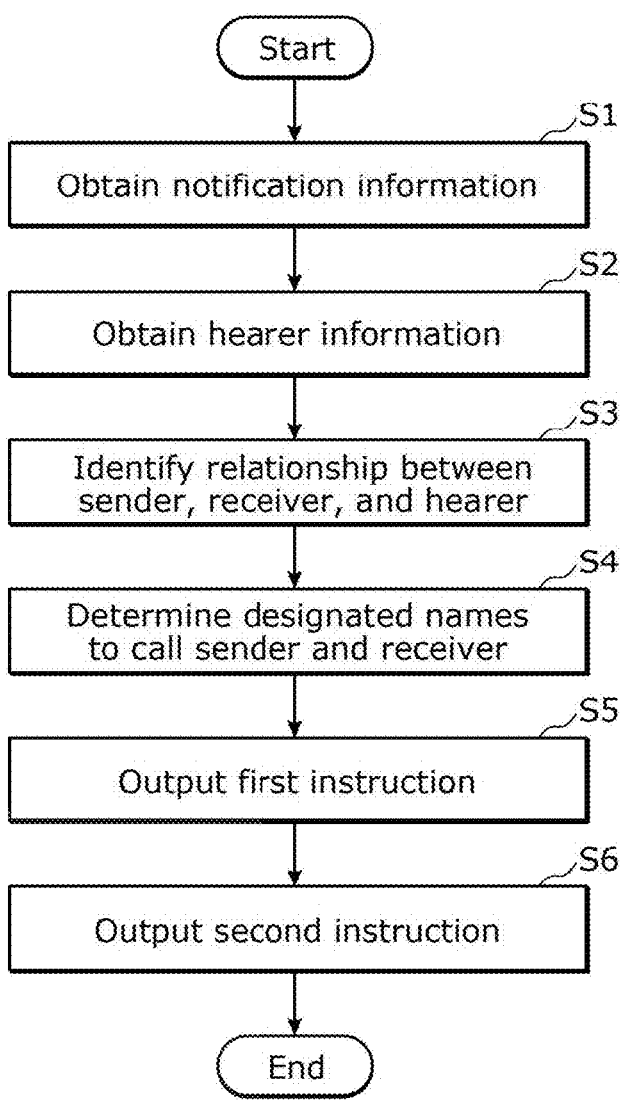
FIG. 4 is a flowchart showing an example operation of the notification system according to the embodiment.

An operation (i.e., a notification method) of notification system 1 according to the embodiment will be described below with reference to FIG. 4. FIG. 4 is a flowchart showing an example operation of notification system 1 according to the embodiment.

First, assume that a sender makes a notification to a receiver by operating first information terminal 31. In this case, first information terminal 31 transmits a signal including a message created by the sender via the network to second information terminal 32 owned by the receiver. First obtainer 11 obtains notification information by receiving the signal via the network (S1).

Next, second obtainer 12 obtains hearer information (S2). As already mentioned, second obtainer 12 obtains the hearer information in accordance with any one of the first example or the second example.

Next, identifier 13 identifies the relationship between the sender, the receiver, and hearer L1, based on the notification information obtained by first obtainer 11 and the hearer information obtained by second obtainer 12 (S3). Next, determiner 14 determines the designated names used to call the sender and the receiver, based on the relationship identified by identifier 13 (S4).

Outputter 15 then outputs, to notification device 2, a first instruction causing notification device 2 to output a first message indicating that the notification has been made (S5). In addition, outputter 15 outputs, to notification device 2, a second instruction causing notification device 2 to output a second message indicating the content of the notification (S6). In the embodiment, since outputter 15 outputs, to notification device 2, an instruction signal including the first instruction and the second instruction, steps S5 and S6 are executed at the same time.

Notification device 2 reproduces and outputs the first message and the second message as sound messages. At this time, in the first message, the sender is represented by the designated name used when hearer L1 calls the sender, and the receiver is represented by the designated name used when hearer L1 calls the receiver.

3. Advantages

Now, the advantages of notification system 1 (and the notification method) according to the embodiment will be described including a comparison to a notification system according to a comparative example. The notification system according to the comparative example causes notification device 2 to output a first message without changing the designated names used to call the sender and the receiver, which is different from notification system 1 according to the embodiment.

Figure 5:
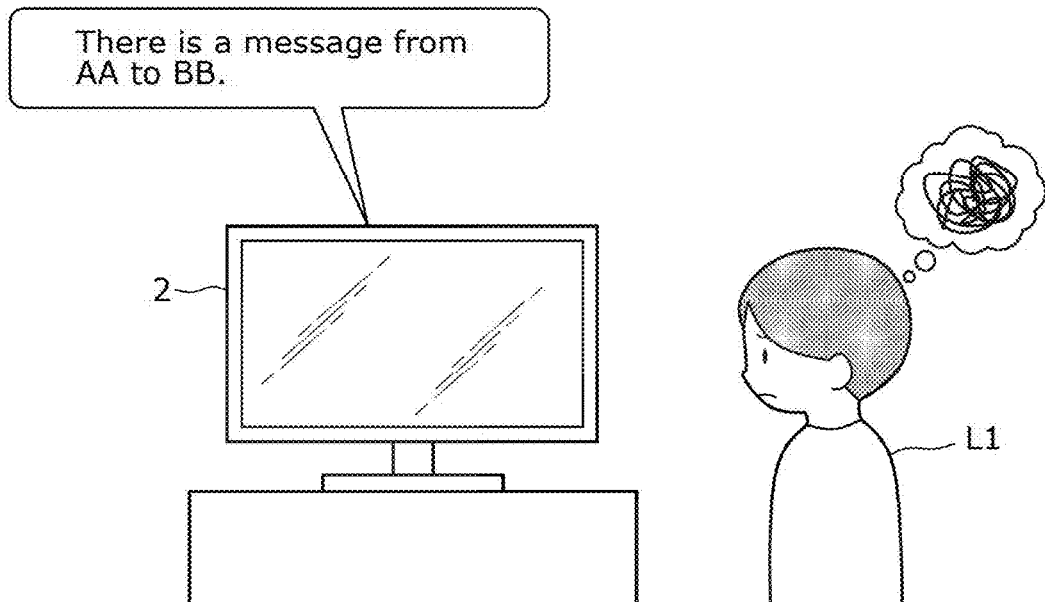
FIG. 5 illustrates problems of a notification system according to a comparative example.

FIG. 5 illustrates problems of the notification system according to the comparative example. In FIG. 5, notification device 2 is a television receiver that outputs a first message and a second message by reproducing sound messages. Note that FIG. 5 does not show how to output the second messages.

As shown in FIG. 5, in the use of the notification system according to the comparative example, the father who is the sender of the first message and the mother who is the receiver are called by the designated names according to the initial settings. In such a case, for example, if hearer L1 is a child, the child calls the father who is the sender "Dad", and the mother who is the receiver "Mom". Even when hearing the names of the father and mother, which are unfamiliar to the child, the child has difficulty in grasping from whom to whom the message is transmitted.

Figure 6:
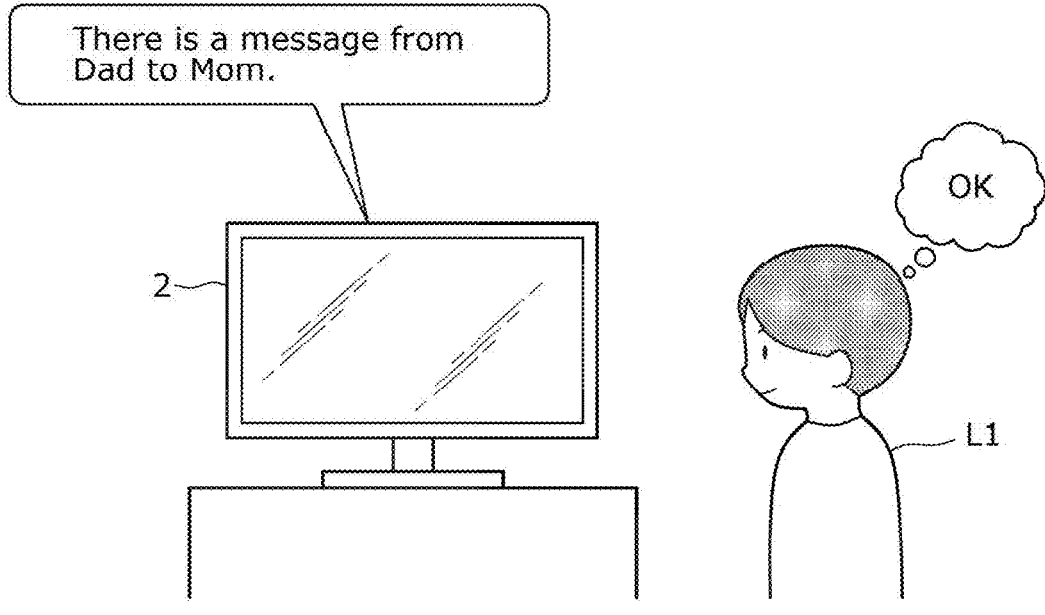
FIG. 6 illustrates advantages of the notification system according to the embodiment.

On the other hand, FIG. 6 illustrates the advantages of notification system 1 according to the embodiment. In FIG. 6, as in FIG. 5, notification device 2 is a television receiver that outputs a first message and a second message by reproducing sound messages. Note that FIG. 6 does not show how to output the second messages as in FIG. 5.

As shown in FIG. 6, in the use of notification system 1 (and the notification method) according to the embodiment, the father who is the sender of the first message is represented by "Dad" which is used when a child who is hearer L1 calls the sender, and the mother who is the receiver is represented by "Mom" which is used when the child who is hearer L1 calls the receiver. It is thus advantages in causing the child who is hearer L1 to easily grasp from whom to whom (i.e., from the father to the mother in this case) the message is transmitted by hearing the familiar designated names used to call the father and mother. That is, in notification system 1 (and the notification method) according to the embodiment, the sender and the receiver of the first message are both represented by the designated names that are familiar to hearer L1. It is thus advantageous in causing hearer L1 to easily grasp the sender and the receiver of the notification.

Here, a receiver usually knows a notification by the sender, by checking a message transmitted to second information terminal 32. However, failing to notice the message to second information terminal 32 or failing to carry second information terminal 32, the receiver is not aware of the notification from the sender. Even in such a case, if hearer L1 who is a third person grasps the sender and the receiver of the notification, hearer L1 can inform the receiver of the fact that the notification has been made.

Variation

As described above, the embodiment has been described above as an example of the technique disclosed in the present application. The technique according to the present disclosure is not limited thereto and modifications, replacements, additions, omissions, etc., may be made to the embodiment as appropriate. The elements in the embodiment described above may be combined to provide another embodiment.

Now, variations of the embodiment will be illustrated.

For example, in the embodiment described above, if there are a plurality of notification devices 2, notification system 1 outputs a first instruction (and a second instruction) to all notification device 2. The output is not limited thereto. For example, outputter 15 may output the first instruction (and the second instruction) to one(s) of the plurality of notification devices 2 near which a person is present. Specifically, obtaining the hearer information as in the second example, second obtainer 12 grasps whether a person is present near each notification device 2, based on a result of recognition by the recognition sensor. In this case, outputter 15 only needs to output the first instruction (and the second instruction) to one(s) of the plurality of notification devices 2 near which a person is present, based on the results of recognition by the recognition sensors of notification devices 2.

For example, in the embodiment described above, outputter 15 outputs both the first instruction and the second instruction to notification device 2. The output is not limited thereto. For example, outputter 15 may output only the first instruction but no second instruction to notification device 2. In this case, notification device 2 reproduces the sound message to output only the first message. In this case as well, for example, hearer L1 who is a third person can hear the first message and inform the receiver of the fact that a notification has been made from the sender to the receiver.

For example, in the embodiment described above, notification system 1 determines the designated names used to call the sender and the receiver using the example where the sender, the receiver, and hearer L1 are family. The relationship is not limited thereto. For example, notification system 1 can determine the designated names used to call the sender and the receiver also where the sender, the receiver, and hearer L1 are friends. As a specific example, notification system 1 can determine the nicknames of the sender and the receiver as the designated names used to call the sender and the receiver, respectively. For example, notification system 1 can determine the designated names used to call the sender and the receiver also where the sender, the receiver, and hearer L1 belong to an organization. As a specific example, the organization is a firm and the sender and the receiver are supervisors of hearer L1. In this case, notification system 1 can determine the titles, such as "Department manager" or "Section manager", as the designated names used to call the sender and the receiver.

For example, in the embodiment described above, notification system 1 is a single device but may include a plurality of devices. If notification system 1 includes a plurality of devices, the components of notification system 1 may be divided into the devices in any manner. For example, some of the components of notification system 1 in the embodiment described above may be included in a facility targeted by notification system 1. That is, the present disclosure may be directed to cloud computing or edge computing.

For example, in the embodiment described above, some or all of the components of notification system 1 according to the present disclosure may be achieved by dedicated hardware or by executing software programs suitable for the components. Each component may be achieved by a program executor, such as a central processing unit (CPU) or a processor, reading and executing a software program recorded in a recording medium, such as a hard disk drive (HDD) or a semiconductor memory.

The components of notification system 1 according to the present disclosure may be one or more electronic circuits. The one or more electronic circuits may be general-purpose circuits or dedicated circuits.

The one or more electronic circuits may include, for example, a semiconductor device, an integrated circuit (IC), or a large-scale integration (LSI) circuit. The IC or the LSI circuit may be integrated on a chip or a plurality of chips. While the IC or the LSI circuit is named here, the integrated circuit may be referred to a system LSI, a very large-scale integration (VLSI), or an ultra large-scale integration (ULSI), depending on the degree of integration. A field programmable gate array (FPGA) programmable after the manufacture of an LSI circuit may be used at least for the same purpose.

The general or specific aspects of the present disclosure may be implemented using a system, a device, a method, an integrated circuit, or a computer program. Alternatively, the general or specific aspects of the present disclosure may be implemented by a non-non-transitory computer-readable recording medium, such as an optical disk, an HDD, or a semiconductor memory, storing the computer program. For example, the present disclosure may be implemented as a program for causing a computer to execute the notification method according to the embodiment described above.

Alternatively, this program may be recorded in a non-non-transitory computer-readable recording medium, such as a CD-ROM, or may be broadcasted via a communication channel, such as the Internet.

As described above, the embodiment has been described above as an example of the technique according to the present disclosure. For the purpose, the appended drawings and the detailed description are provided.

The elements used in the appended drawings and the detailed description include not only those essential to solve the problems but also those unessential to solve the problems and used just to illustrate the technique. Even if included in the appended drawings or the detailed description, such unessential elements are not to be immediately construed as essential.

The embodiment described above is just for illustrating the technique according to the present disclosure. Accordingly, various modifications, replacements, additions, omissions, etc., may be made to the embodiment within the scope of the claims and their equivalents.

CONCLUSION

As described above, notification system 1 according to a first aspect includes first obtainer 11, second obtainer 12, identifier 13, determiner 14, and outputter 15. First obtainer 11 obtains notification information including the sender of a notification and the receiver of the notification. Second obtainer 12 obtains hearer information including hearer L1 of the notification. Identifier 13 identifies the relationship between the sender, the receiver, and hearer L1, based on the notification information obtained by first obtainer 11 and the hearer information obtained by second obtainer 12. Determiner 14 determines the designated names used to call the sender and the receiver, based on the relationship identified by identifier 13. Outputter 15 outputs, to notification device 2, a first instruction causing notification device 2 to output a first message indicating that the notification has been made. In the first message, the sender and the receiver are represented by the designated names determined by determiner 14.

With this configuration, the sender and the receiver of the first message are both called by the designated names that are familiar to hearer L1. It is thus advantageous in causing hearer L1 to easily grasp the sender and the receiver of the notification.

Notification system 1 according to a second aspect is an embodiment of the first aspect. Second obtainer 12 obtains the hearer information that identifies hearer L1, based on the location of notification device 2.

With this configuration, the person most likely to be near notification device 2 is identified as hearer L1. It is thus advantageous in increasing the accuracy in determining the designated names used to call the sender and the receiver of the first message.

Notification system 1 according to a third aspect is an embodiment of the first aspect. Second obtainer 12 obtains the hearer information that identifies hearer L1, based on a result of recognizing a person near notification device 2.

With this configuration, what kind of person is near notification device 2 is recognized to identify hearer L1. It is thus advantageous in increasing the accuracy in determining the designated names used to call the sender and the receiver of the first message.

Notification system 1 according to a fourth aspect is an embodiment of any one of the first to third aspects. A plurality of notification devices 2 are provided, each of which is notification device 2. Outputter 15 outputs the first instruction to one of the plurality of notification devices 2 near which a person is present.

With this configuration, the first instruction is not output to notification device(s) 2 near which there is no person. There is no need to output the first message unnecessarily, which is advantageous.

Notification system 1 according to a fifth aspect is an embodiment of any one of the first to fourth aspects. Outputter 15 further outputs, to notification device 2, a second instruction causing notification device 2 to output a second message indicating the content of the notification.

This configuration is advantageous in causing hearer L1 to inform the receiver of the content of the notification.

Notification device 2 according to a sixth aspect includes instruction obtainer 21 and notification outputter 22. Instruction obtainer 21 obtains a first instruction from notification system 1 according to any one of the first to fifth aspects. When instruction obtainer 21 obtains the first instruction, notification outputter 22 outputs the first message.

With this configuration, the sender and the receiver of the first message are both represented by the designated names that are familiar to hearer L1. It is thus advantageous in causing hearer L1 to easily grasp the sender and the receiver of the notification.

The notification method according to a seventh aspect includes obtaining notification information including the sender of a notification and the receiver of the notification (S1). This notification method further includes obtaining hearer information including hearer L1 of the notification (S2). This notification method further includes identifying the relationship between the sender, the receiver, and hearer L1 based on the notification information and the hearer information obtained (S3). This notification method further includes determining designated names used to call the sender and the receiver, based on the relationship identified (S4). This notification method further includes outputting, to notification device 2, a first instruction causing notification device 2 to output a first message indicating that the notification has been made (S5). In the first message, the sender and the receiver are represented by the designated names determined by the determiner.

With this configuration, the sender and the receiver of the first message are both called by the designated names that are familiar to hearer L1. It is thus advantageous in causing hearer L1 to easily grasp the sender and the receiver of the notification.

The recording medium according to an eighth aspect is a non-transitory computer-readable recording medium having recorded thereon a program for causing one or more processors to execute the notification method according to the seventh aspect.

With this configuration, the sender and the receiver of the first message are both called by the designated names that are familiar to hearer L1. It is thus advantageous in causing hearer L1 to easily grasp the sender and the receiver of the notification.

INDUSTRIAL APPLICABILITY

The present disclosure is applicable as a system, so on, that cause a notification device to output a message indicating that a notification has been made.

The invention claimed is:

1. A notification system comprising:
a first obtainer that obtains notification information including a sender of a notification and a receiver of the notification;
a second obtainer that obtains hearer information including a hearer of the notification;
an identifier that identifies a relationship between the sender, the receiver, and the hearer, based on the notification information obtained by the first obtainer and the hearer information obtained by the second obtainer;
a determiner that determines designated names used to call the sender and the receiver, based on the relationship identified by the identifier; and
an outputter that outputs, to a notification device, a first instruction causing the notification device to output a first message indicating that there is the notification, wherein
in the first message, the sender and the receiver are represented by the designated names determined by the determiner.

2. The notification system according to claim 1, wherein the second obtainer obtains the hearer information that identifies the hearer, based on a location of the notification device.

3. The notification system according to claim 1, wherein the second obtainer obtains the hearer information that identifies the hearer, based on a result of recognizing a person near the notification device.

4. The notification system according to claim 1, wherein a plurality of notification devices are provided, each being the notification device, and
the outputter outputs the first instruction to one of the plurality of notification devices near which a person is present.

5. The notification system according to claim 1, wherein the outputter further outputs, to the notification device, a second instruction causing the notification device to output a second message indicating content of the notification.

6. A notification device comprising:
an instruction obtainer that obtains the first instruction from the notification system according to claim 1; and
a notification outputter that outputs the first message, when the instruction obtainer obtains the first instruction.

7. A notification method comprising:
obtaining notification information including a sender of a notification and a receiver of the notification;
obtaining hearer information including a hearer of the notification;
identifying a relationship between the sender, the receiver, and the hearer, based on the notification information and the hearer information obtained;
determining designated names used to call the sender and the receiver, based on the relationship identified; and
outputting, to a notification device, a first instruction causing the notification device to output a first message indicating that the notification has been made, wherein
in the first message, the sender and the receiver are represented by the designated names determined.

8. A non-transitory computer-readable recording medium having recorded thereon a program for causing one or more processors to execute the notification method according to claim 7.

* * * * *